March 8, 1966 H. J. WITKOWSKI 3,238,707
AIR FILTER
Filed Feb. 13, 1963

INVENTOR.
HENRY J. WITKOWSKI
BY *Charles L. Lovercheck*
*Attorney.*

United States Patent Office 3,238,707
Patented Mar. 8, 1966

3,238,707
AIR FILTER
Henry J. Witkowski, 561 E. 18th St., Erie, Pa.
Filed Feb. 13, 1963, Ser. No. 258,329
6 Claims. (Cl. 55—510)

This invention relates to filters and, more particularly, to the type of filter suitable for use on carburetor intakes for internal combustion engines and the like.

Prior filters for intakes on carburetors and the like required physically large devices in order to provide a sufficiently large quantity of air flow therethrough. The present invention provides a filter made of foam plastic material housed in a molded plastic case which is simple and economical to manufacture and can easily be removed in order to replace or service the filter media therein.

It is, accordingly, an object of the present invention to provide an improved filter for carburetors and the like.

Another object of the invention is to provide an improved filter.

A further object of the invention is to provide a filter which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
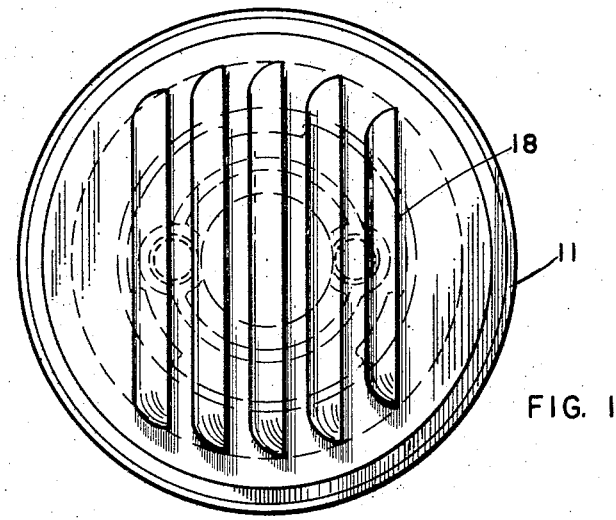
FIG. 1 is a top view of a filter according to the invention.

Now with more particular reference to the drawing, the filter shown has a cover 11 supported on a base 13 with a filter block 12 comprising the filter media therein. Lugs may be provided on the upper end of the filter media engaging the inside of the cover 11 to hold the filter media against a flange 21. The filter block 12 is supported on the base 13. The filter block may be in the form of a cylindrical block of porous foam plastic.

The base 13 is in the form of a ring which has a cylindrical portion 22 which has an inwardly extending hook or bead 23 adapted to underlie a mounting plate 15. The mounting plate 15 is in the form of a round flat plate having an opening at its center. The mounting plate 15 may be supported over the inlet of a carburetor or the like.

The cylindrical portion 22 has the integral, outwardly extending flange 21 attached thereto. A cylindrical portion at the outer edge extends slightly upwardly and has a bead 20 outwardly extending thereon at the upper side thereof.

The cover 11 is generally cup-shaped with a closed bottom having slots 18 therein formed by striking the plastic material outwardly to provide shields for the slots. The filter block may be so mounted on a vehicle that the open sides of the slots 18 will extend toward the rear of the vehicle when the filter block is installed on the carburetor thereof.

The wall of the cup-shaped cover 11 diverges toward the base 13 and has an inwardly extending hook like member 19 on the end thereof which underlies the bead 20.

The entire cover and base may be made of molded plastic material which is slightly resilient so that the hook 23 may clamp under the mounting plate 15 and the hook like member 19 may snap under the bead 20. Then a ring 16, which is slightly wedge shaped in cross section with the inside surface diverging with the outside surface in an amount equal to the angle of the outside surface of the cover 11 as shown, may slip over the cover to hold the hook like member 19 under the bead 20.

An annular spacer 17 is supported on the base 13 with a sealing gasket 14 therebetween to prevent any leakage of air around the filter block between the filter media and the spacer 17. The spacer 17 is generally U-shaped in cross section so that it has slight resiliency as its legs spread out laterally. The spacer may be U-shaped as shown with the legs of the U resting on the base plate and on the gasket 14.

Figure 2:
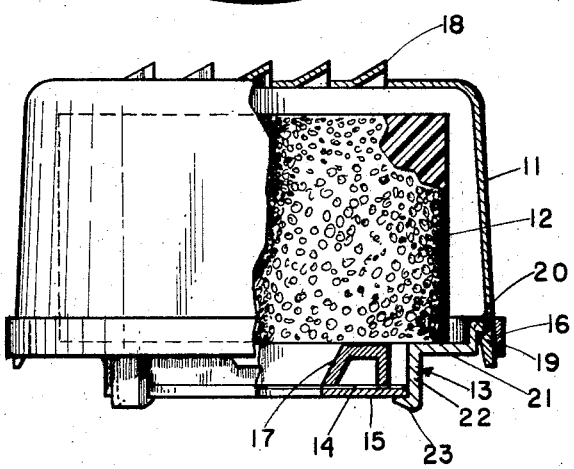
FIG. 2 is a side view partly in section of the filter shown in FIG. 1.
Figure 3:
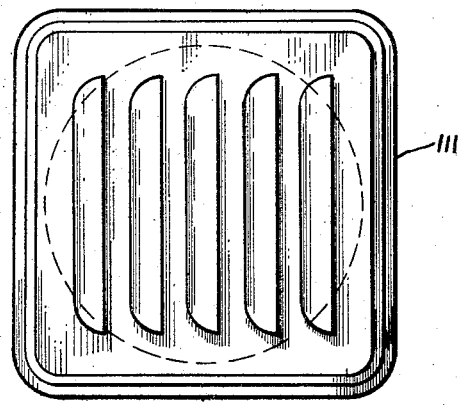
FIG. 3 is a top view of a square filter such as shown in FIG. 1.

In the embodiment of the invention shown in FIG. 3, a cover 111 is almost identical to that shown in FIGS. 1 and 2 except that the cover is square in cross section. This illustrates an alternate way of making the filter.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A filter comprising a flat mounting plate with an opening therethrough, a base, said base having an upwardly extending side, an inwardly extending member on said base adapted to snap over and underlie said mounting plate, an outwardly extending bead on the outside of said base, a cover in the form of a cup-shaped member having a closed end and sides with slots in said closed end, the rim of said cup-shaped member receiving said outwardly extending bead therein, means on said rim and extending continuously therearound underlying said bead on said base and adapted to snap over said bead to remove said cup-shaped member therefrom, and a block of foam material resting on said base and sealingly engaging said base.

2. The filter recited in claim 1 wherein the closed end of said cover is generally round.

3. The filter recited in claim 1 wherein the closed end of said cover is generally square.

4. The filter recited in claim 1 wherein said foam block is substantially smaller than said cover whereby a path for air from said slots to said block is formed.

5. The filter recited in claim 1 wherein said cup-shaped member is made of resilient molded plastic and a band generally wedge shaped in cross section and made of relatively rigid material is disposed around the rim of said cup-shaped member to hold said inwardly extending member in engagement with said bead.

6. A filter comprising a flat mounting plate with an opening therethrough, a base, said base having a hollow cylindrical portion with an inwardly extending bead on the lower end of said cylindrical portion underlying said plate, an integral, outwardly extending flange attached to the upper end of said cylindrical portion, an outwardly extending bead on the outer end of said flange, a cup like cover, said cover having slots in the upper side thereof, said cover having a peripheral hook on the inside of the rim thereof, said hook underlying said outwardly extending bead on opposite sides thereof, a generally cylindrical filter block of foam plastic material supported on said flange, a ring around said rim of said cover, said ring being generally wedge shaped in cross section and urging said hook under said outwardly extending bead, and an annular spacer between said plate and said filter block outward of said opening in said plate and disposed between said filter block and said plate, holding said plate in position.

References Cited by the Examiner

UNITED STATES PATENTS

| | | | |
|---|---|---|---|
| 2,539,378 | 1/1951 | Stootman | 55—505 |
| 2,920,717 | 1/1960 | Tuttle et al. | 55—510 |
| 2,966,234 | 12/1960 | Alexander | 55—507 |
| 2,999,562 | 9/1961 | Lechtenberg | 55—502 |
| 3,104,966 | 9/1963 | Goulet et al. | 55—510 |

HARRY B. THORNTON, *Primary Examiner.*